June 4, 1940.    P. A. SPERRY    2,202,875
METHOD OF MOLDING A SHOE SOLE
Filed May 12, 1938
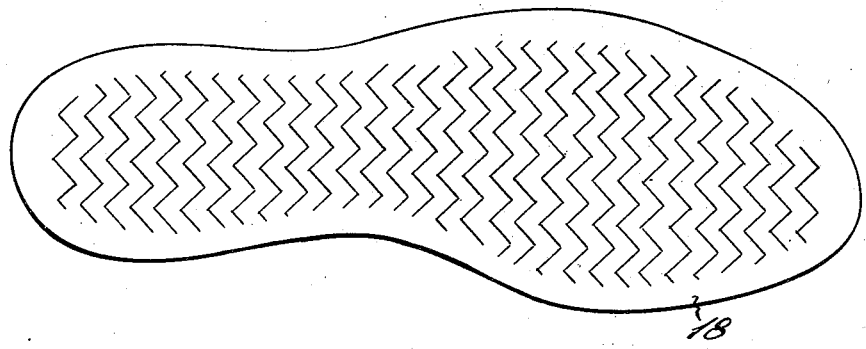
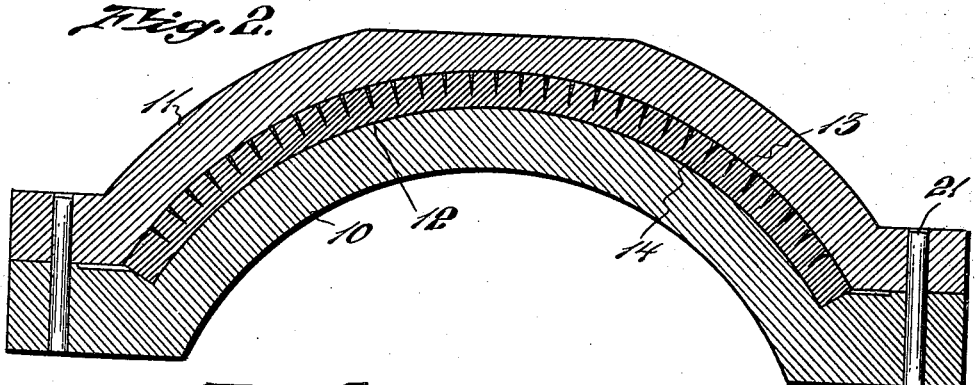
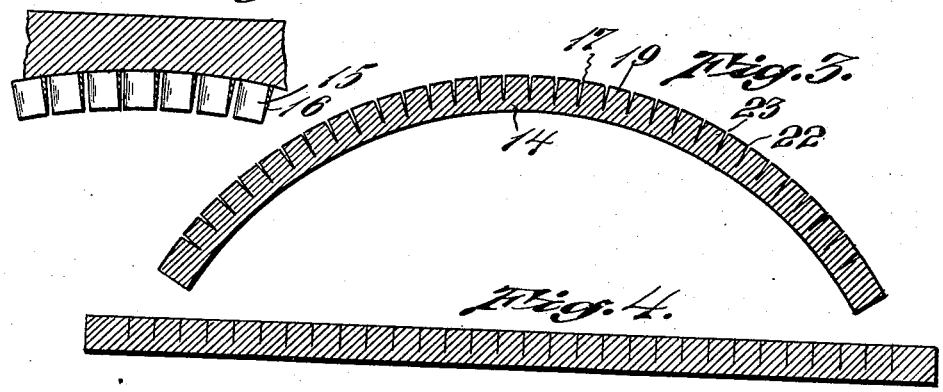
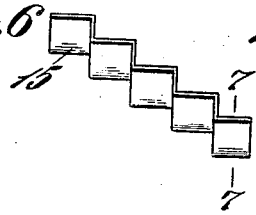 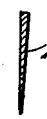
INVENTOR.
Paul A. Sperry
BY Barlow & Barlow
ATTORNEYS.

Patented June 4, 1940

2,202,875

UNITED STATES PATENT OFFICE 2,202,875

METHOD OF MOLDING A SHOE SOLE

Paul A. Sperry, New Haven, Conn.

Application May 12, 1938, Serial No. 207,463

3 Claims. (Cl. 18—47.5)

This invention relates to a shoe sole particularly of the type which has an outer or bottom surface capable of resisting slipping, such as is more fully described in my co-pending application, Serial No. 102,827, filed September 28, 1936; and this invention has for one of its objects the molding of a shoe sole in the required form which will make cutting of the sole after molded unnecessary.

Another object of the invention is to provide by molding a sole which will be comparable to the form provided by cutting but may with greater facility and economy locate the position and determine the extent of sections and the junction between them that a more accurate and better appearing sole may be provided.

Another object of the invention is the formation of a mold which will enable the production of the sole in the desired formation by molding in a different shape than that desired, such as on the arc of a circle and then flattening the sole out into the finished shape to cause recesses with edges spaced from each other as when the molding occurs to be closed by straightening out of the curved or arcuate formation of the molded sole.

With these and other objects in view, the invention consists of certain novel features of construction, as will be more fully described, and particularly pointed out in the appended claims.

In the accompanying drawing:

Fig. 1 is a bottom plan view of a finished sole;

Fig. 2 is a sectional view of a mold with the sole in the mold;

Fig. 3 is a sectional view of the sole alone as taken from the mold shown in Fig. 2;

Fig. 4 is a sectional view of the sole as shown in Fig. 3 flexed to straight or single plane position;

Fig. 5 is a fragmental perspective view of the upper section of the mold shown in Fig. 2 and showing the zigzag fin secured to its undersurface;

Fig. 6 is a perspective view of the fin which is secured to the inside of the upper section of the mold;

Fig. 7 is a sectional view on line 7—7 of Fig. 6.

In the formation of a rubber shoe sole with sections coming in contact with each other and extending across the sole, I have previously formed such sole by cutting, the cutter being of such shape as to not remove any of the stock but merely provide an incision dividing the sole into a plurality of sections which will easily flex with reference to the body portion of the sole so as to present a sharp edge to a surface which may be wet or slippery. The cutting of slits of this sort requires a precision machine and rather accurate handling; and in order that the sole might be molded in the finished form which it is desired, which now requires a molding plus a cutting operation, I have arranged to mold this sole upon the arc of a circle with fins extending from one side wall of the cavity of the mold which will form recesses of a shape which would occur were the sole to be flexed on substantially the arc of a circle after cutting, so that after the sole is molded and flexed to a single plane, such as substantially the shape which it assumes on the shoe, the opposite walls of the recesses will be moved into contact and the sole, substantially the same as one formed by cutting, will be provided; and the following is a more detailed description of the present embodiment of this invention, illustrating the preferred means by which these advantageous results may be accomplished:

With reference to the drawing, 10 designates the lower section and 11 the upper section of a mold which I have formed, there being a recess provided between the sections in the shape which the rubber, of which the sole is to be formed, is to be formed in the molding operation. The lower section 10 has a convex surface 12 of a smooth character formed by recessing this surface of the section 10. Cooperating with this recess there is an arcuate concave surface 13 which is parallel and closely follows the arc of the surface 12 so as to provide for a formation of material such as rubber 14 in the recess of substantially equal thickness. From the surface 13 and projecting into the recess there are a series of fins 15 which are of zigzag shape across the mold and each of wedge-shape as at 16 in cross-section. These fins will cause recesses 17 to be formed in the material 14 which are wedge-shaped when the sole 14 is in the arcuate shape as shown in Fig. 3.

The recesses 17 extend across the sole but terminate short of the edge to leave an uncut border 18 around the entire periphery of the sole, and these fins may be as close together as desired to provide sections 19 between these recesses of a desired thickness to provide the required flexibility so that they may flex to present the square corner edges of the sections to have the functions more fully described in my above mentioned application.

The mold is suitably secured together by pins 21 and the material inserted therein in some known manner. Vulcanizing or partial vulcanizing takes place after the material is forced into the recess in the mold and after this partial processing the molded sections 10 and 11 are separated and the material such as shown in Fig. 3 extracted therefrom.

When the sole, as shown in Fig. 3, is flexed to the position shown in Fig. 4, the side walls 22 and 23 of the recesses 17 come together, as shown in Fig. 4, and present a smooth complete surface, such as shown in Fig. 1, to the ground, each section being sufficiently flexible to perform the action desired as above pointed out.

The foregoing description is directed towards the method and construction illustrated, but I desire it to be understood that I reserve the privilege of resorting to all the equivalent changes to which the construction and method are susceptible, the invention being defined and limited only by the terms of the appended claims.

I claim:

1. The step in the method of making a slip retarding shoe sole which comprises molding and shaping a thermoplastic material on an arc of a circle with wedge shaped fins extending from the concave side of the mold to form correspondingly shaped recesses in the convex side of the molded material, the relation between the opposite converging surfaces of said wedge fins and the said arc being such that the flexing of said molded material into a flat plane will cause the opposite surfaces of each recess to contact and completely close each recess, then flexing said sole to such flat shape and fixing it in such shape.

2. The step in the method of making a slip retarding shoe sole which comprises molding and shaping a thermoplastic material in the shape of a shoe sole on an arc of a circle with wedge shaped fins of wavy shape extending from the concave side of the mold to form correspondingly shaped serrated recesses in the convex side of the molded material extending generally transversely of the arc, the relation between the opposite converging surfaces of said wedge fins and the said arc being such that the flexing of said molded material into a flat plane will cause the opposite surfaces of each recess along its serrated extent to contact and completely close each recess, then flexing said sole to such flat shape and fixing it in such shape.

3. The step in the method of making a slip retarding shoe sole which comprises molding and shaping a thermoplastic material in the shape of a shoe sole on an arc of a circle with wedge shaped fins of wavy shape extending from the concave side of the mold to form correspondingly shaped serrated recesses in the convex side of the molded material extending generally transversely of the arc and terminating short of the opposite marginal edges of the sole, the relation between the opposite converging surfaces of said wedge fins and the said arc being such that the flexing of said molded material into a flat plane will cause the opposite surfaces of each recess along its serrated extent to contact and completely close each recess, then flexing said sole to such flat shape and fixing it in such shape.

PAUL A. SPERRY.